(No Model.) 2 Sheets—Sheet 1.
J. R. WILLIAMS.
WHEELED DIRT SCRAPER.
No. 336,195. Patented Feb. 16, 1886.
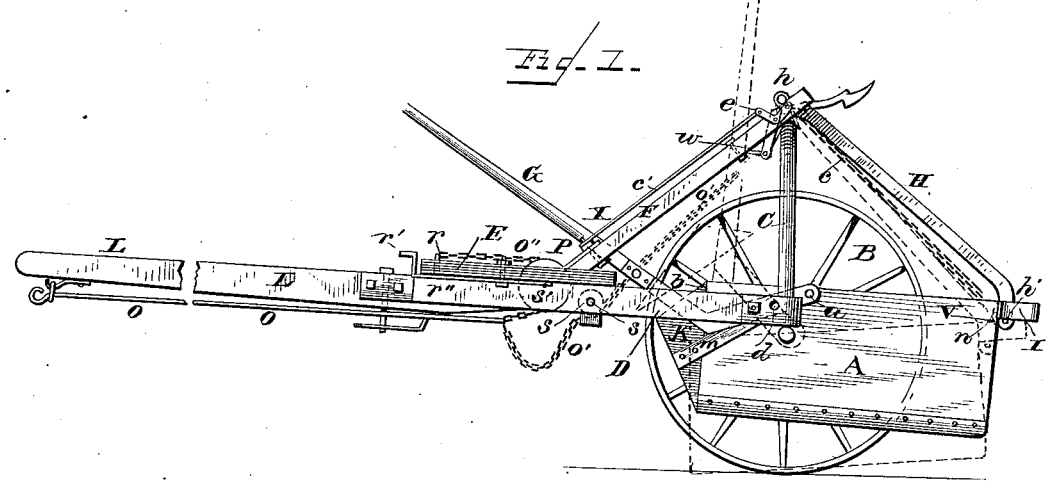
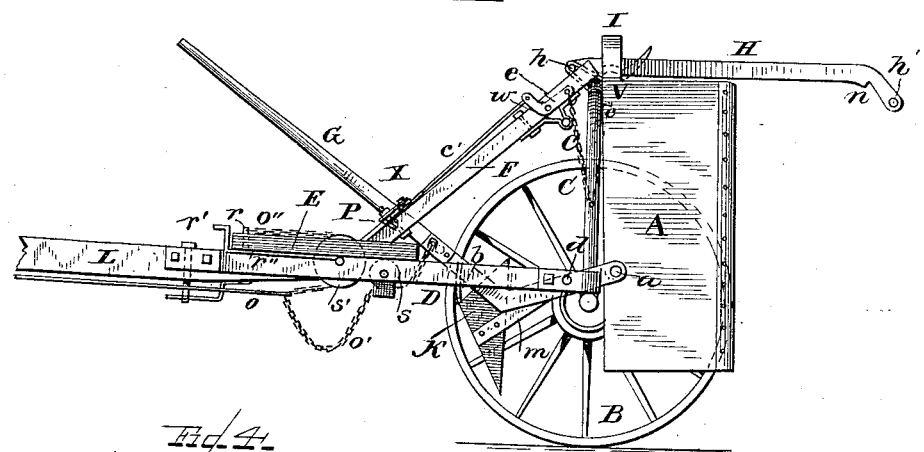
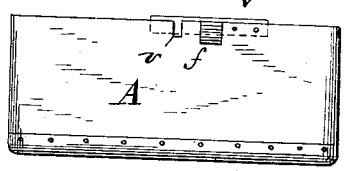
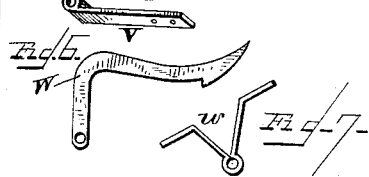
WITNESSES
F. L. Durand
A. Krehbiel
INVENTOR
John R. Williams,
per Jas. T. Drummond,
Attorney (No Model.) 2 Sheets—Sheet 2.
J. R. WILLIAMS.
WHEELED DIRT SCRAPER.
No. 336,195. Patented Feb. 16, 1886.
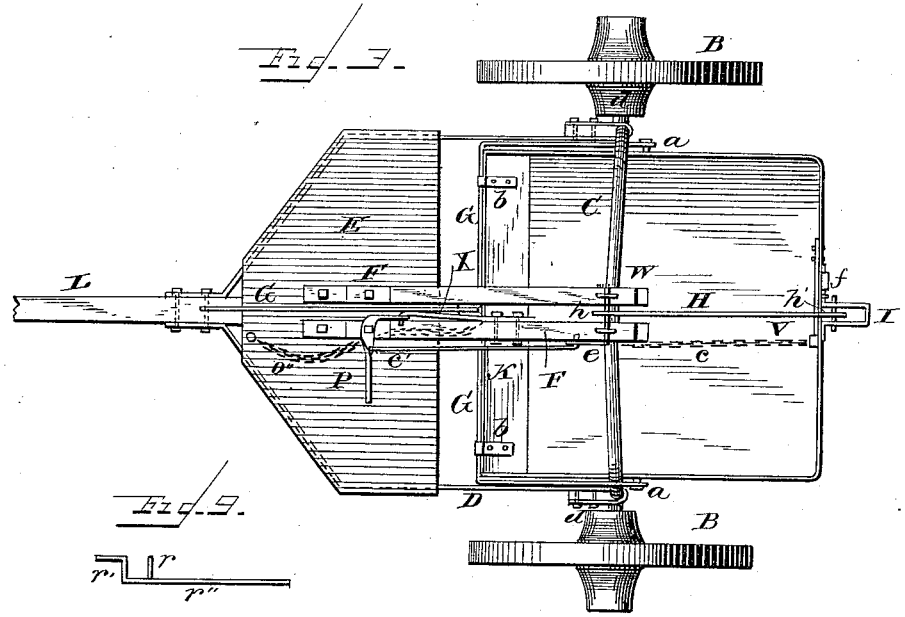
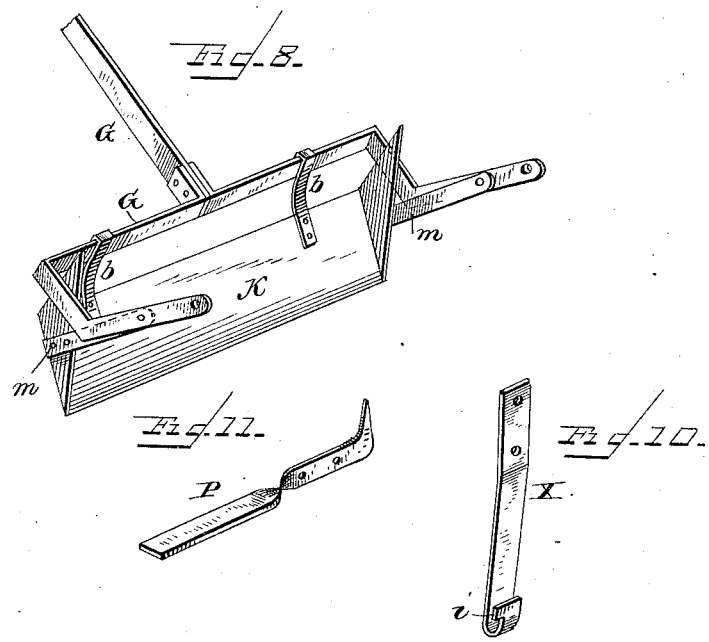
WITNESSES
F. L. Ourand
A. Krehbiel
INVENTOR
John R. Williams,
Per Jas. T. Drummond,
Attorney

UNITED STATES PATENT OFFICE.

JOHN R. WILLIAMS, OF KANSAS CITY, MISSOURI.

WHEELED DIRT-SCRAPER.

SPECIFICATION forming part of Letters Patent No. 336,195, dated February 16, 1886.

Application filed April 6, 1885. Serial No. 161,385. (No model.)

*To all whom it may concern:*

Be it known that I, JOHN R. WILLIAMS, a citizen of the United States, residing at Kansas City, in the county of Jackson and State of Missouri, have invented a new and useful Improvement in Wheeled Dirt-Scrapers, of which the following is a specification.

My invention relates to certain improvements in my wheeled scraper patented October 9, 1883, No. 286,246, and has for its object the improvement of mechanism for supporting and carrying the rear end of the scoop, for utilizing the power of an auxiliary or snatch team both in filling a large scraper-scoop and in raising it when filled to a proper height for traveling with said load to the dump or to its destination, and for giving independent or free action to a forward end-gate of the scraper-scoop.

My invention consists in providing a supporting-bar for carrying the rear end of the scoop, it being arranged with a pivotal connection at its upper end, with supporting posts, in combination with an upward-bent arched axle, and having its lower end provided with stops operating in connection with a rearward-projecting loop and a spring catch on said scraper-scoop, so as to allow said supporting-bar to slide lengthwise through said loop in the process of dumping the load.

It further consists in providing a combination of mechanism consisting of a draft-rod having one or more chains attached to its rear end, which chains work around one or more pulleys so arranged that the power of an auxiliary team may be applied, first in filling the scoop and afterward to assist in elevating the load to a proper traveling height, being conveniently manipulated by the attendant.

It still further consists in providing pivoted swinging arms and limiting-hooks to a forward end-gate of the scraper-scoop, being arranged as hereinafter shown, and working in combination and harmony with a bifurcated bail-lever, so as to give proper independence to the downward movement of said end-gate as a means of securing necessary adjustments in the event of unyielding obstructions lodging under it when filling the scoop.

I will proceed to further describe my invention by reference to the accompanying drawings, which constitute part of this specification, of which—

Figure 1 is a side elevation of the machine embodying my invention, as represented in a traveling position when loaded, with dotted lines showing the position of the adjusting parts when the scoop is lowered for filling. It, however, has one wheel removed for convenience in showing the improved working parts, and is also represented with part of the tongue and auxiliary draft-rod as being broken out and their forward ends closed back for the purpose of showing said ends in the limited space allotted for said figure. Fig. 2 is a side elevation of the same with said parts in the position occupied after the load shall have been dumped and the scoop raised for traveling empty. Fig. 3 is a plan view of said machine in position as shown at Fig. 1. Fig. 4 is an elevation of the rear end of the scoop. Fig. 5 is a spring-latch, which for use is attached to the inside and at the upper edge of the rear end of the scoop, and is designed for latching said rear end of the scoop to the lower end of the rear supporting-bar as a means of preventing said rear end of the scoop from rising while being filled. Fig. 6 is a hook for holding the scoop in a semi-inverted position while traveling empty. Fig. 7 is a suspended support to which the inner end of the hook, Fig. 6, is pivoted. Fig. 8 is a perspective of the bifurcated manipulating or bail lever, and the forward end-gate, including its swinging arms and limiting-hooks, which are attached thereto, showing the manner of combining these several parts. Fig. 9 is a spring provided with an upward-projecting pin and a treadle-stud, which spring is securely fastened to the under side of the attendant's platform, with said pin and stud projecting upward above the upper plane of said platform. Said pin is designed for hitching the loose end of a draft-chain connected with a supplementary draft-rod, which serves to connect the draft of an auxiliary team while filling the scraper, and is attached to the spring for the purpose of releasing the draft therefrom when the scoop shall have been filled, by pressing said spring and pin downward and thereby transferring said draft to the lifting mechanism, as will hereinafter be explained. Fig. 10 is a spring-latch for taking over the handle of the lifting-lever to prevent it rising by the weight of load suspended from its lifting ends; and Fig. 11 is a treadle-lever for operating both of the spring-latches above named, by means of connections and couplings therewith, which I will hereinafter describe.

For further illustration similar reference-letters will indicate like parts in the different figures, and dotted lines, not otherwise expressed, parts hidden from view, of which—

A is the scoop; B, the wheels; C, the axle, which is bent so as to elevate its center sufficient to constitute a proper support for the carrying mechanism of the rear end of the scoop in its varied positions, by means of the other parts, also combined therewith.

D are draft-bars, which are rigidly fastened to the tongue L, and also to the axle C, by binding their rearward ends outward around the upward bends of said axle and securely fastening them thereto.

E is a platform, upon which the attendant stands and rides while manipulating the machine and driving the team. Said platform rests on and is securely fastened to the bars D at different places, and also the rear end of the tongue L, thereby strengthening said parts.

F is a pair of posts set in a bracing manner upon the platform E, having an intervening space between them sufficient for the working of the spring-latch $x$, and the lever-handle G between them. Said posts, serving as braces to stay the axle in its elevated position, are rigidly fastened to it by means of inverted U-shaped bolts serving as clamps, or other suitable means known to the art.

G is a bifurcated lifting-lever, composed of two angularly-bent bars and a straight bar, forming a bail and a straight handle, all being fastened together, as shown at Fig. 8. Said lever has its bearings on pins or bolts $d$, which bolts pass through the two sections and intermediate filling of the draft-bars D at that place as a means of support, as well as through apertures in the bail-pieces of said lever, serving as fulcrums for the same, and also through the ends of the swinging arms $m$ of the end-gate K, thereby constituting working-pivots also for said arms. Said lever is attached by pivotal connections at its extreme rearward ends to the upper edge of the scoop at the points $a$, by which means the said scoop is lifted by a downward pressure on the handle of said lever.

H is a swinging bar, pivoted at its upper end to the upper ends of the posts F, as shown at $h$, with its lower or rearward end passing through a loop, I, which loop is rigidly fastened to the rear end of the scoop, and through which said bar slides lengthwise when said scoop is manipulated for dumping. The lower end of said bar at $h'$ has a pin through it transversely, serving as a stop to limit the relative downward movement of that part of the scoop by means of said pin or stop forming a bearing, upon which said loop rests. It thereby becomes the carrying device for the rear end of said scoop. Said bar is also provided with a notch or clutch near its lower end, as shown, under which a spring latch, V, (see Fig. 5, it being attached to the upper edge and inside of the rear end of the scoop,) takes, thereby serving as a means of preventing the rear end of the scoop from rising while being filled. In order that the catch on said bar may come in contact with the latch V, a notch, $v$, (see Fig. 4,) is cut out of the upper edge of the rear end of the scoop.

In my former invention above mentioned, a rearward supporting-bar was arranged to slide forward in the process of dumping, being so operated by means of cogs on its under edge working in the teeth of a cogged pinion manipulated by the attendant. Said raising mechanism is found to be unnecessary in this my invention, as the weight of dirt forward of and below the pivotal points of the scoop, as herein arranged, with the friction also caused by its forward end striking the ground by properly lowering it in harmony with the forward movement of the team is amply sufficient to raise its rear end so as to tip it as desired, and by said old arrangement of the rear lifting-bar, when the scoop is in a semi-inverted position, said bar extends forward, and is thereby an inconvenience to the attendant in handling the lifting-lever, which is therefore objectionable, and which objection is obviated by this my present invention.

A spring-latch, X, Fig. 10, is fastened to the inside of the nigh post, F, so that a downward movement of the lever G will cause it to yield, so as to pass below its lower point, when it will take over said lever and hold it down while carrying the scoop and its contents suspended from the rear ends of said forked lever or bail.

P is a treadle-lever which is pivoted to the nigh post F, so that the upward bend of its inner end will impinge against the inner side of the upward extension $i$ of the spring-latch X, so that when the outer end of said treadle is depressed the lever will be released by thus bending said spring-latch outward from over it, which may be done at will by the attendant pressing against the said treadle with his foot. Said treadle is also coupled to the spring-latch V by means of a chain, $c$, and either a rod or chain, $c'$, and a bell-crank, $e$, which bell-crank is also pivoted to the nigh post F near its top, and serves as a coupling for said rod and chains, whereby a continued coupling is thus made, so that a downward pressure of said treadle will also bend the spring-latch V forward from under the clutch or notch $n$ in the bar H, so as to allow said bar to slide freely endwise through the loop I, which action will be required in dumping a load, which dumping is accomplished by means of the attendant raising the forward end of the lever G, so as to thereby lower the forward end of the scoop A, causing it to strike the ground, when, by releasing the spring V from the notch

*n*, as above described, the forward movement of the team causes the scoop to rotate on its pivots, thereby rising over the bank of dirt being thus discharged until it and said bar H will assume the positions shown at Fig. 2. A hook, W, Fig. 6, is pivoted to a suspended support, *w*, Fig. 7, which support is attached to the off post F, so that said hook will rest against the axle C in proper position for taking over a catch, *f*, on the rear end of the scoop (when said scoop is in the position shown at Fig. 2) as a means of holding it in said position while traveling empty.

A forward end-gate, K, is hung on swinging arms *m*, which arms are loosely pivoted with the bail or forks of the lifting-lever G to the draft-bars D, as above described, by means of the same common fulcrum or pivot, so that said gate may have an independent action, thereby either closing the mouth of the scoop simultaneously with its being raised, or otherwise in the event of any unyielding obstructions for the time being lodging under said gate. It may at a subsequent time be closed, after said scoop may have been partially or entirely raised, so as to allow said obstructions either to dislodge or adjust themselves sufficiently to permit of its closing by its independent action, or at least so that the attendant may easily close it by pressing it downward with his foot, as his riding position is convenient for said purpose.

I am aware that forward end-gates have before been provided for closing the mouth of a scraper-scoop, some of which have been rigidly fixed to the manipulating-lever or to other analogous means requiring simultaneous closing with the elevating of the scoop, which arrangement often causes a failure or barrier to the working of the machine from causes above mentioned, as unyielding obstructions, preventing the full closing of the gate when the parts are rigidly fixed, and requiring simultaneous action, will also prevent the action of the machine. Other end-gates have been arranged having independent automatic action; but, owing to the general arrangement and construction of the machine, no assistance can be afforded by the attendant in the event of becoming obstructed, as above mentioned; hence the advantages to be derived by this my invention, as by the general construction of my machine it places the attendant in a convenient position for aiding the gate to close when thus partially obstructed. Said end-gate K is limited in its downward movement by means of the hooks *b* catching over the bail or diverging forks of the lever G, which prevents it from falling too low, yet allowing it to have free upward motion.

As a means of attaching an additional or helping team for filling large scrapers and for using said team as an assistant in raising their filled scoops to a proper height for traveling, a supplementary draft-rod, *o*, is provided, which rod has a ring or hook at its forward end, for attaching said team, which will place it forward of the regular draft-team for the machine; and said rod, at its rearward end, is provided with two chains, *o'* and *o"*. The rear or loose end of the chain *o"* is provided with a ring, which is used for hitching over a pin, *r*, after drawing said chain and the rod *o* rearward sufficient for said chain to be bent around the pulley *s'* and extend forward for said purpose, in which position the draft of the extra or helping team (when hitched to the forward end of said rod) is applied to assist in filling the scraper, as said attachment connects with the main draft-bars of the machine. The rearward end of the chain *o'* is permanently attached to the lever G at a point that it will allow the said lever G to be raised for lowering the scoop while filling, (being the position shown by the dotted lines in Fig. 1,) which will take up the slack of said chain, (it running under the pulley *s*,) and when a sufficient forward movement shall have been made to fill the scoop the attendant with his foot presses downward on the stud *r'*, which depresses the spring *r"*, causing the pin *r* to recede from within the ring on the chain *o"*, thereby releasing the coupling and the draft therefrom and transferring it to the chain *o'*, when the rod *o* and said chains *o'* and *o"* are drawn slightly forward, and the lever G is brought down thereby to the position represented by the full lines in said Fig. 1, which raises the load. The aperture in the platform E, through which the chain *o"* passes, being too small for the passage of the ring on its end, serves as a stop for the same, and when said helping team shall have been loosed from said rod *o*, the attendant again takes hold of said ring, draws said rod and chains backward, and again places said ring over the pin *r*, in readiness for again filling the scoop.

The above transfer of power may be accomplished by the use of but one pulley instead of using the two pulleys *s s'*, by allowing both of the chains *o'* and *o"* to run around the one and same pulley, which will work with equal effect and nearly as smoothly.

The scoop is lowered for filling by raising the handle of the lever G to the position shown by dotted lines at Fig. 1, which movement of said lever (by the scoop being suspended from its ends in rear of its fulcrums) gives said scoop a forward descending curve, which also causes the rearward supporting-bar H to rotate on its pivotal point, and thereby to describe a like curve of larger radius at its lower end, causing a less descent of the scoop at its rear than forward end, which gives said scoop a slight rearward inclination while filling, which is well adapted for the purpose, and which prevents friction and wear of the scoop-bottom incident to scrapers lying flat on the ground while being thus filled, and in raising the load a reverse movement of said parts causes the forward part of said scoop to rise slightly the higher, which is suitable for traveling with a load.

Having thus fully described my invention so as to enable others skilled in the art to which it appertains to understand the same, what I claim as new, and desire to secure by Letters Patent, is—

1. In combination with the posts F, axle C, and scoop A, the supporting-bar H, pivoted at its upper end to the posts F, and provided with a limiting-stop at its lower end, and a loop, I, on the rear end of the scraper-scoop, substantially as shown, for the purpose specified.

2. In combination with the posts F, axle C, scoop A, and the swinging supporting-bar H, the notch or clutch $n$ in said bar H, spring-latch V, chain $c$, bell-crank $e$, rod or chain $c'$, and treadle P, substantially as shown, for the purpose specified.

3. In combination with the platform E, and arched axle C, the supporting-posts F, arranged as a pair, with a space between them suitable for the working of the lever G and latch X, thereby serving as guides to limit the lateral movement of said lever, substantially as shown, for the purposes specified.

4. In combination with the posts F and the lifting-lever G, the spring-latch X and treadle-lever P, substantially as shown, for the purpose specified.

5. In combination with the tongue-bar D and platform E, bifurcated lever G, arranged, as herein shown, and pivots $d$, the end-gate K, having swinging arms $m$, rigidly attached thereto, which arms are pivoted in common with the fulcrum of said lifting-lever, and the limiting-hooks $b$, all substantially as shown, for the purpose specified.

6. In combination with the tongue L, platform E, and lever G, the rods $o$, chains $o'$ and $o''$, pulleys $s$ and $s'$, spring $r''$, stud $r'$, and pin $r$, all substantially as shown, for the purposes specified.

JOHN R. WILLIAMS.

Witnesses:
D. S. HARRIMAN,
N. H. COMSTOCK.